United States Patent
Stinebring et al.

(10) Patent No.: US 9,527,521 B2
(45) Date of Patent: Dec. 27, 2016

(54) ADJUSTABLE STEERING COLUMN ASSEMBLY

(71) Applicants: Scott A. Stinebring, Auburn, MI (US); Robert D. Maida, Pinconning, MI (US)

(72) Inventors: Scott A. Stinebring, Auburn, MI (US); Robert D. Maida, Pinconning, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 13/749,105

(22) Filed: Jan. 24, 2013

(65) Prior Publication Data

US 2013/0192409 A1 Aug. 1, 2013

Related U.S. Application Data

(60) Provisional application No. 61/590,897, filed on Jan. 26, 2012.

(51) Int. Cl.
*B62D 1/18* (2006.01)
*B62D 1/184* (2006.01)
*B62D 1/16* (2006.01)

(52) U.S. Cl.
CPC ............... *B62D 1/184* (2013.01); *B62D 1/16* (2013.01)

(58) Field of Classification Search
CPC ........... B62D 1/184; B62D 1/18; B62D 1/183; B62D 1/185; B62D 1/187; B62D 1/189

USPC ............................ 74/492, 493; 280/775–777
See application file for complete search history.

(56) References Cited

U.S. PATENT DOCUMENTS

| | | | | |
|---|---|---|---|---|
| 3,373,965 | A * | 3/1968 | Bien et al. | 248/205.1 |
| 4,244,237 | A * | 1/1981 | Sprunger | 74/493 |
| 5,213,003 | A * | 5/1993 | Speich | 74/493 |
| 5,596,907 | A * | 1/1997 | Barton | 74/493 |
| 5,607,184 | A * | 3/1997 | Barton | 280/775 |
| 5,655,413 | A | 8/1997 | Barton | |
| 5,743,150 | A * | 4/1998 | Fevre et al. | 74/493 |
| 6,695,349 | B2 * | 2/2004 | Bohlen et al. | 280/775 |
| 6,824,166 | B2 * | 11/2004 | Peel | 280/775 |
| 6,932,387 | B2 * | 8/2005 | Laisement et al. | 280/777 |
| 8,042,426 | B2 * | 10/2011 | Jo | 74/493 |
| 2005/0104353 | A1 * | 5/2005 | Ikeda et al. | 280/775 |
| 2008/0053263 | A1 * | 3/2008 | Matsui et al. | 74/493 |
| 2010/0326230 | A1 * | 12/2010 | Oh | 74/493 |
| 2013/0174685 | A1 * | 7/2013 | Yamamoto | 74/493 |

* cited by examiner

*Primary Examiner* — William Kelleher
*Assistant Examiner* — Jake Cook
(74) *Attorney, Agent, or Firm* — Cantor Colburn LLP

(57) ABSTRACT

An adjustable steering column assembly comprises a column support bracket fixed to a vehicle structure and disposed about a steering column. A position lock selectively prevents or facilitates movement of the steering column relative to the column support bracket in an adjustment plane and defines an adjustment range of the steering column along a non-adjustment direction intersecting the adjustment plane. A lateral stabilizer biases the steering column toward a stabilized position lying within the adjustment range of the steering column along the non-adjustment direction.

20 Claims, 4 Drawing Sheets

ADJUSTABLE STEERING COLUMN ASSEMBLY

RELATED APPLICATION

The present patent application claims the benefit of priority from U.S. provisional patent application No. 61/590,897 filed on Jan. 26, 2012.

BACKGROUND OF THE INVENTION

The present invention relates generally to locking, adjustment-facilitating mechanisms for steering columns and, more specifically, to systems and methods for stabilizing a steering column assembly while facilitating adjustments thereof.

A steering column lock includes locking features that selectively prevent or facilitate adjustments to the positioning and orientation of the steering column. In a locked state, a steering column lock prevents changes or adjustments to the position and/or orientation of the steering column in one or more directions relative to a structure of a vehicle. In an unlocked state, a steering column lock facilitates adjustments of the steering column in one or more directions, such as a telescoping direction oriented along a longitudinal direction of the steering column or in a raking direction oriented transversely to the longitudinal direction of the steering column.

An adjustable steering column assembly is configured to facilitate adjustment of the steering column in a plane (i.e., in one or two directions lying in an adjustment plane). Often, the adjustment plane is oriented vertically, but other orientations of the adjustment plane, such as horizontal or other intermediate orientations are also possible. A steering column lock may function in its locking mode by imposing a compressive load upon the steering column in a direction that includes at least a component that is oriented transversely to the adjustment plane. Put another way, the direction of the compressive load is oriented at an angle (e.g., a 90 degree angle, i.e., transversely) relatively to the adjustment plane. Therefore, when the steering column lock is functioning in its locking mode, the steering column lock tends to restrain movement of the steering column not only in the adjustment plane, but also in the direction that intersects (e.g., is perpendicular to) the adjustment plane, thereby defining a non-adjustment direction). For example, in a steering column assembly configured for adjustment in a vertically oriented plane, when the steering column lock is functioning in its locking mode, the steering column lock tends to restrain movement of the steering column in the horizontal (i.e., lateral) direction.

When the steering column lock is functioning in its adjustment-facilitating mode, however, the steering column lock no longer restrains movement of the steering column in the non-adjustment direction. Accordingly, upon transition of the steering column lock from the locking mode to the adjustment-facilitating mode, movement of the steering column in the non-adjustment direction may occur. Unfortunately, while a vehicle operator may anticipate that transitioning the steering column lock from the locking mode to the adjustment-facilitating mode might result in movement of the steering column within the adjustment plane, the vehicle operator may be surprised by movement of the steering column in the non-adjustment direction. In some situations, the unrestrained steering column may be motivated to move in the non-adjustment direction by forces inherent in the steering column system, by gravitational forces, by forces imposed on the steering column assembly by the operator, or by acceleration forces associated with movement of the vehicle.

In some steering column assemblies, the transition from the locking mode to the adjustment-facilitating mode is accomplished via a manually operated mechanical actuator, such as a lever arm. In other steering column assemblies, however, the transition may be accomplished automatically, such as through an electro-mechanical or electromagnetic apparatus providing for very fast transition between the locking mode to the adjustment-facilitating mode. In such quickly transitioning systems, the movement of the steering column may be sudden.

Accordingly, it is desirable to provide a selectively locking and adjustment-facilitating mechanism for a steering column assembly that enables the steering column to be stabilized in a non-adjustment direction while facilitating adjustment of the steering column in the adjustment plane.

SUMMARY OF THE INVENTION

In a first aspect, an adjustable steering column assembly comprises a column support bracket fixed to a vehicle and disposed about a steering column. A position lock selectively prevents or facilitates movement of the steering column relative to the column support bracket in an adjustment plane and defines an adjustment range of the steering column along a non-adjustment direction intersecting the adjustment plane. A lateral stabilizer biases the steering column toward a stabilized position lying within the adjustment range of the steering column along the non-adjustment direction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
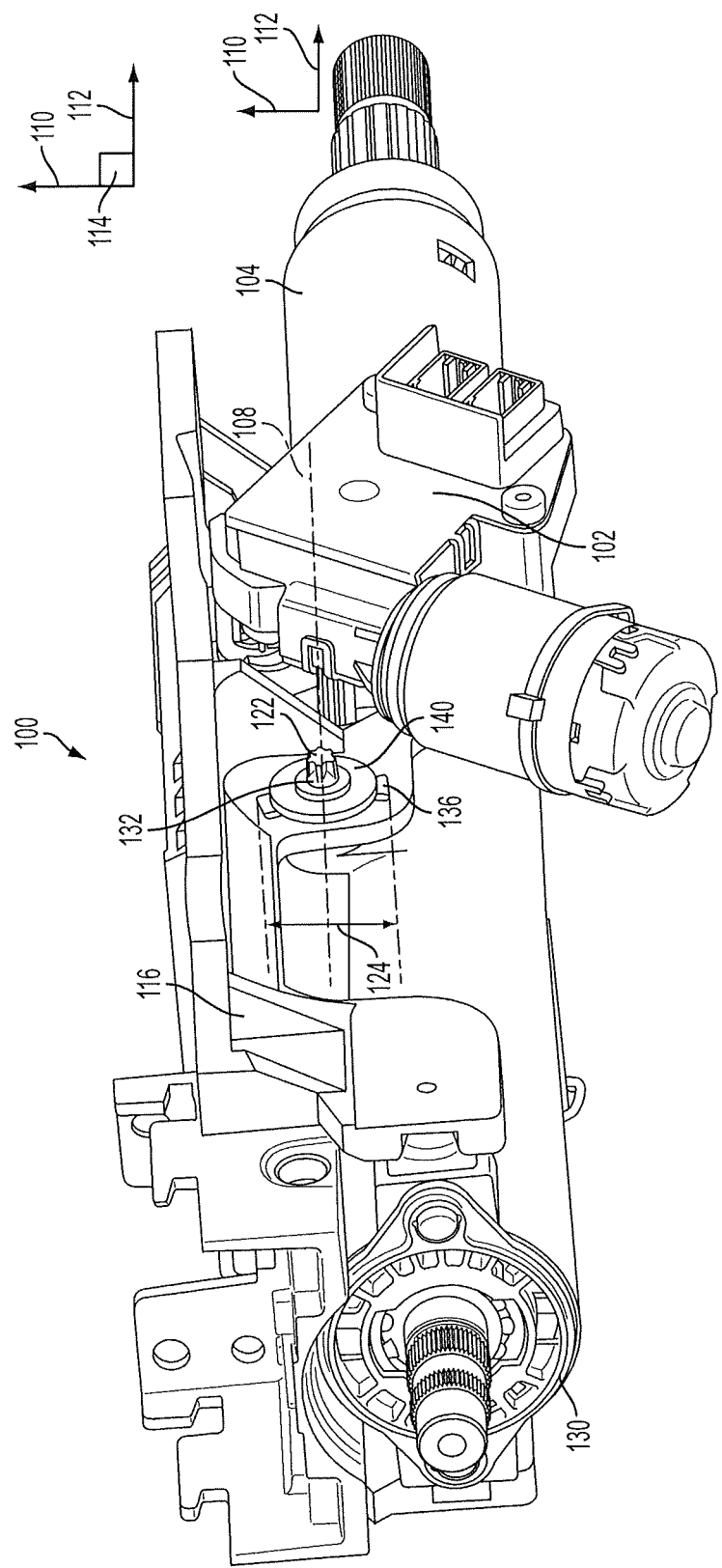
FIG. 1 is a drawing showing a perspective view of an exemplary adjustable steering column assembly.
Figure 2:
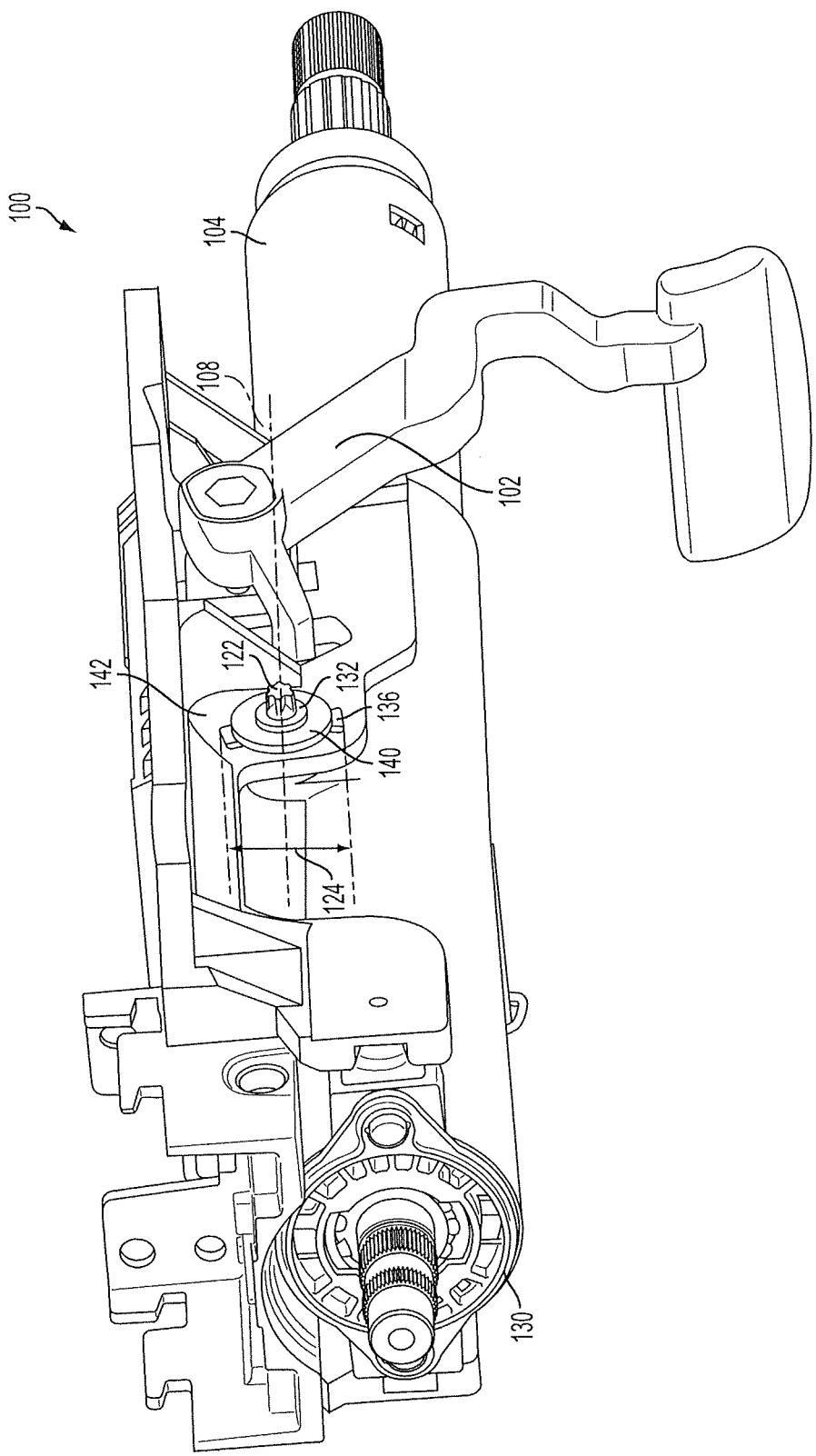
FIG. 2 is a drawing showing a perspective view of an exemplary adjustable steering column assembly.
Figure 3:
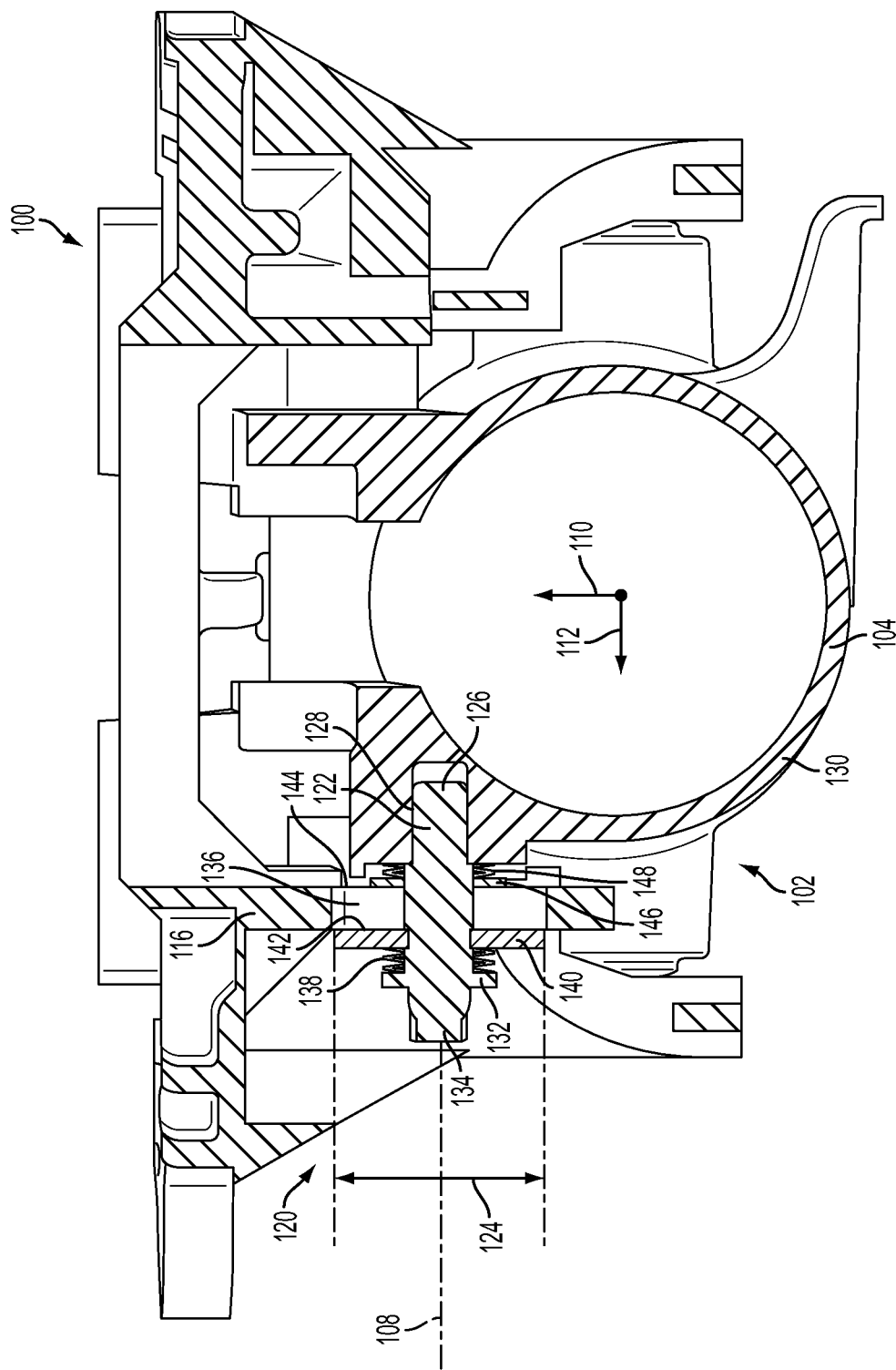
FIG. 3 is a cutaway drawing showing an end view of portions of an exemplary adjustable steering column assembly.
Figure 4:
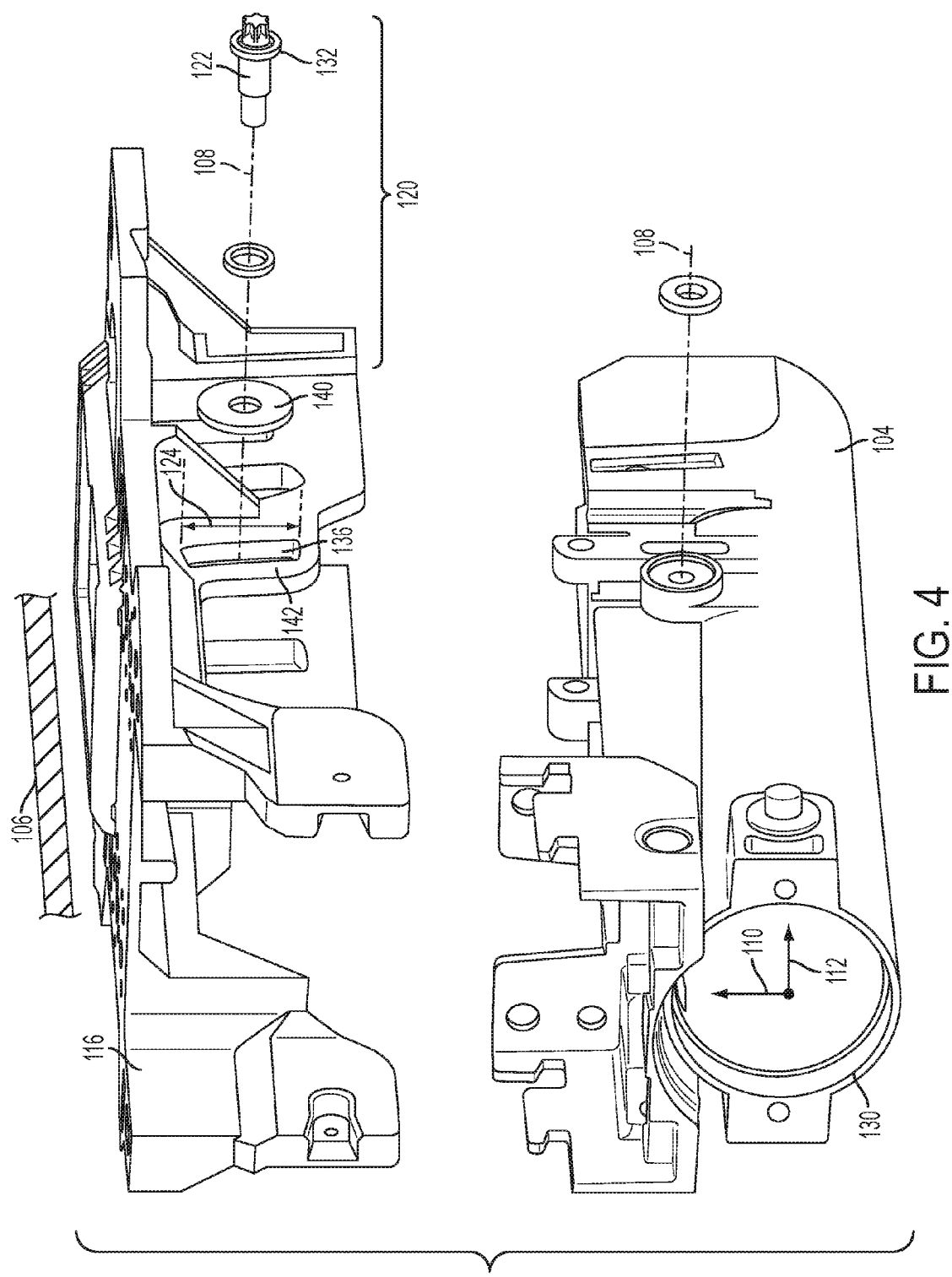
FIG. 4 is a perspective drawing showing an exploded perspective view of an exemplary adjustable steering column assembly.

Referring now to the Figures, where the invention will be described with reference to specific embodiments, without limiting same, FIG. 1 shows a perspective view of an exemplary adjustable steering column assembly 100. The steering column assembly 100 includes a position lock 102 for selectively alternating between a locking mode, wherein adjustments to the a position of a steering column 104 relative to a vehicle structure 106 are inhibited, and an adjustment mode, wherein adjustments to a position of the steering column 104 relative to the vehicle structure 106 are facilitated. As will become evident from the following detailed description, the adjustable steering column assembly 100 enables the steering column 104 to be stabilized in a fixed position along a non-adjustment direction 108 while also facilitating adjustments to the position of the steering column 104 along the two substantially orthogonal directions (e.g., a raking direction 110 and a telescoping direction 112) that define an adjustment plane 114.

As shown in FIGS. 1-4, an adjustable steering column assembly 100 includes a column support bracket 116 that is fixed to the vehicle structure 106 so as to remain stationary with respect to the vehicle structure 106. In an exemplary embodiment, the column support bracket 116 is disposed about a generally cylindrical outer jacket 130 of the steering column 104. The position lock 102 is configured for selectively alternating between: (a) a locking mode, wherein the position lock 102 is configured for substantially preventing (or inhibiting) position adjustments (i.e., movements) of the steering column 104 relative to the column support bracket 116 in the adjustment plane 114; and (b) an adjustment mode, wherein the position lock 102 is configured for facilitating position adjustments (i.e., movements) of the steering column 104 relative to the column support bracket 116 in the adjustment plane 114. In the adjustment mode, the position lock 102 facilitates movement of the steering column 104 in the adjustment plane 114 and defines an adjustment range 124 of the steering column 104 transversely to the non-adjustment direction 108. The non-adjustment direction 108 intersects the adjustment plane 114. In an exemplary embodiment, the non-adjustment direction 108 is normal to the adjustment plane 114.

In an exemplary embodiment, a lateral stabilizer 120 is configured for biasing the steering column 104 toward a stabilized position of the steering column 104 along the non-adjustment direction 108. In an exemplary embodiment, the lateral stabilizer 120 comprises a tension member 122 that is fixed, at a first end 126, to the steering column 104 and disposed along the non-adjustment direction 108. In an exemplary embodiment, the tension member 122 comprises a shoulder bolt threaded into a threaded hole 128 defined an outer jacket 130 of the steering column 104.

In an exemplary embodiment, the tension member 122 has a shoulder 132 at a distal end 134 and passes through a slot 136 defined by the column support bracket 116. The tension member 122 is positioned so as to impose a compressive load between the shoulder 132 and the column support bracket 116. An outer compression spring 138 and an outer washer 140 are disposed between the shoulder 132 and an outer surface 142 of the column support bracket 116 so as to force the outer washer 140 into contact with the outer surface 142 of the column support bracket 116. In an exemplary embodiment, the outer washer 140 and the outer compression spring 138 are disposed co-axially about the tension member 122, and the outer compression spring 138 is compressed between the shoulder 132 and the outer washer 140. In an exemplary embodiment, the outer washer 140 comprises a low-friction, plastic material.

Accordingly, the outer compression spring 138 causes the tension member 122 to bias the steering column 104, and its outer jacket 130, toward the column support bracket 116 such that the outer jacket 130 of the steering column 104 bears against the inner surface 144 of the column support bracket 116, thus holding the outer jacket 130 in the lateral design position, and thus eliminating unwanted lateral movement. It is understood that the inner washer 146 may be disposed between the outer jacket 130 of the steering column 104 and the inner surface 144 of the column support bracket 116 to better facilitate movement of the steering column 104 relative to the column support bracket 116 in the adjustment plane 114. The slot 136 defined by the column support bracket 116 is shaped so as to accommodate movement of the tension member 122 with the steering column 104 as the steering column 104 moves in the adjustment plane 114.

In an exemplary embodiment, an inner compression spring 148 and an inner washer 146 are disposed between the steering column 104 and an inner surface 144 of the column support bracket 116 so as to force the inner washer into contact with the inner surface 144 of the column support bracket 116. In an exemplary embodiment, the inner washer 146 and the inner compression spring 148 are disposed co-axially about the tension member 122, and the inner washer 146 comprises a low-friction, plastic material.

Accordingly, the inner compression spring 148 causes the tension member 122 to bias the steering column 104, and its outer jacket 130, away from the column support bracket 116 such that the shoulder 132 at the distal end 134 of the tension member 122 bears against the outer surface 142 of the column support bracket 116, thus holding the outer jacket 130 in the lateral design position, and thus eliminating unwanted lateral movement. It is understood that the outer washer 140 may be disposed between the shoulder 132 at the distal end 134 of the tension member 122 and the outer surface 142 of the column support bracket 116 to better facilitate movement of the steering column 104 relative to the column support bracket 116 in the adjustment plane 114.

In another exemplary embodiment, an outer compression spring 138 and an outer washer 140 are disposed between the shoulder 132 and an outer surface 142 of the column support bracket 116 so as to force the outer washer 140 into contact with the outer surface 142 of the column support bracket 116. In addition, an inner compression spring 148 and an inner washer 146 are disposed between the steering column 104 and an inner surface 144 of the column support bracket 116 so as to force the inner washer 146 into contact with the inner surface 144 of the column support bracket 116.

Accordingly, the outer compression spring 138 causes the tension member 122 to bias the steering column 104, and its outer jacket 130, toward the column support bracket 116, and the inner compression spring 148 causes the tension member 122 to bias the steering column 104, and its outer jacket 130, away from the column support bracket 116 such that the steering column 104 is suspended in an intermediate position between a first position in which the outer jacket 130 of the steering column 104 bears against the inner surface 144 of the column support bracket 116 and a second position in which the shoulder 132 at the distal end 134 of the tension member 122 bears against the outer surface 142 of the column support bracket 116, thus holding the outer jacket 130 in the lateral design position, and thus eliminating unwanted lateral movement.

It is understood that the inner washer 146 may be disposed between the outer jacket 130 of the steering column 104 and the inner surface 144 of the column support bracket 116 and that the outer washer 140 may be disposed between the shoulder 132 at the distal end 134 of the tension member 122 and the outer surface 142 of the column support bracket 116 to better facilitate movement of the steering column 104 relative to the column support bracket 116 in the adjustment plane 114. The slot 136 defined by the column support bracket 116 is shaped so as to accommodate movement of the tension member 122 with the steering column 104 as the steering column 104 moves in the adjustment plane 114.

When the steering column 104 moves in the adjustment plane 114, each of the tension member 122, the outer washer 140, the inner washer 146, the outer compression spring 138, and the inner compression spring 148 moves with the outer jacket 130 of the steering column 104 relative to the column support bracket 116.

When the position lock 102 is in an unlocked state so as to enable the steering column 104 assemble to function in an adjustment mode, the position lock 102 is un-clamped from the steering column 104. Therefore, in addition to facilitating movement of the steering column 104 in the adjustment plane 114 (e.g., in generally transverse telescoping and raking directions), the position lock, by itself, may no longer prevent (i.e., may allow) some movement (i.e., play) of the steering column in the non-adjustment direction 108 that intersects the adjustment plane 114.

In an exemplary embodiment, the portion of the column support bracket 116 defining the slot 136 and comprising the inner surface 144 and the outer surface 142 may be much stiffer than a portion of the column support bracket 116 hosting an assembly for selectively facilitating or preventing raking movement of the steering column 104, thus allowing the steering column 104 to remain in the lateral design position when transitioning between unlocked and locked states.

Thus, an adjustable steering column assembly is provided with a selectively locking and adjustment-facilitating mechanism. The adjustable steering column assembly enables the steering column to be stabilized in a non-adjustment direction while facilitating adjustment of the steering column in an adjustment plane.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column assembly comprising:
    a column support bracket fixed to a vehicle structure (106) and disposed about a steering column;
    a first component that is a position lock for selectively preventing or facilitating movement of the steering column relative to the column support bracket in an adjustment plane, the position lock defining an adjustment range (124) of the steering column along a non-adjustment direction intersecting the adjustment plane, and
    a second component that is a lateral stabilizer that biases the steering column toward a stabilized position, the stabilized position lying within the adjustment range (124) of the steering column along the non-adjustment direction.

2. An adjustable steering column assembly as in claim 1, wherein the lateral stabilizer comprises a tension member that is fixed, at a first end, to the steering column and oriented along the non-adjustment direction.

3. An adjustable steering column assembly as in claim 2, wherein the tension member is a shoulder bolt threaded into a threaded hole defined in an outer jacket of the steering column.

4. An adjustable steering column assembly as in claim 1, wherein the tension member has a shoulder at a distal end and passes through a slot defined by the column support bracket and is positioned so as to impose a compressive load between the shoulder and the column support bracket.

5. An adjustable steering column assembly as in claim 4, further comprising an outer compression spring and an outer washer disposed between the shoulder and an outer surface of the column support bracket so as to force the outer washer into frictional contact with the outer surface of the column support bracket.

6. An adjustable steering column assembly as in claim 5, wherein the outer washer and the outer compression spring are disposed about the tension member.

7. An adjustable steering column assembly as in claim 5, wherein the outer compression spring is compressed between the shoulder and the outer washer.

8. An adjustable steering column assembly as in claim 5, wherein the outer washer comprises a low-friction, plastic material.

9. An adjustable steering column assembly as in claim 4, further comprising an inner compression spring and an inner washer disposed between the steering column and an inner surface of the column support bracket so as to force the inner washer into frictional contact with the inner surface of the column support bracket.

10. An adjustable steering column assembly as in claim 9, wherein the inner washer and the inner compression spring are disposed about the tension member.

11. An adjustable steering column assembly as in claim 9, wherein the inner washer comprises a low-friction, plastic material.

12. An adjustable steering column assembly as in claim 4, further comprising an outer compression spring and an outer washer disposed between the shoulder and an outer surface of the column support bracket, and an inner compression spring and an inner washer disposed between the steering column and an inner surface of the column support bracket such that the steering column is suspended in an intermediate position between a first position in which an outer jacket of the steering column bears against the inner surface of the column support bracket and a second position in which the shoulder bears against the outer surface of the column support bracket.

13. An adjustable steering column assembly as in claim 2, wherein the tension member is disposed along an axis different from that of the position lock.

14. An adjustable steering column assembly comprising:
    a column support bracket fixed to a vehicle structure (106) so as to be stationary with respect to the vehicle structure, and disposed about a steering column;
    a position lock for selectively preventing or facilitating movement of the steering column relative to the column support bracket in an adjustment plane, the position lock defining an adjustment range (124) of the steering column along a non-adjustment direction intersecting the adjustment plane, and
    a lateral stabilizer that biases the steering column toward a stabilized position lying within the adjustment range (124) of the steering column along the non-adjustment direction, the lateral stabilizer comprising a tension member and a shoulder, the tension member positioned to impose a compressive load between the shoulder and the stationary column support bracket.

15. An adjustable steering column assembly as in claim 14, wherein the tension member is fixed, at a first end, to the steering column and oriented along the non-adjustment direction.

16. An adjustable steering column assembly as in claim 15, wherein the tension member is a shoulder bolt threaded into a threaded hole defined in an outer jacket of the steering column.

17. An adjustable steering column assembly as in claim 14, further comprising an outer compression spring and an outer washer disposed between the shoulder and an outer surface of the column support bracket so as to force the outer washer into frictional contact with the outer surface of the column support bracket.

18. An adjustable steering column assembly as in claim 17 wherein the outer washer and the outer compression spring are disposed about the tension member.

19. An adjustable steering column assembly as in claim 17, wherein the outer compression spring is compressed between the shoulder and the outer washer.

20. An adjustable steering column assembly as in claim 14, further comprising an inner compression spring and an inner washer disposed between the steering column and an inner surface of the column support bracket so as to force the inner washer into frictional contact with the inner surface of the column support bracket.

* * * * *